United States Patent
Henriet et al.

(10) Patent No.: US 11,088,449 B2
(45) Date of Patent: Aug. 10, 2021

(54) RADIO FREQUENCY TRANSCEIVER WITH AN ANTENNA HAVING SELECTABLE POLARIZATION

(71) Applicant: Sensata Techonologies, Inc., Attleboro, MA (US)

(72) Inventors: Nicolas R. Henriet, Arcon (FR); Thomas Guillemin, Falerans (FR); Fabien Kolly, Morteau (FR)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 102 days.

(21) Appl. No.: 16/428,279

(22) Filed: May 31, 2019

(65) Prior Publication Data

US 2020/0381827 A1    Dec. 3, 2020

(51) Int. Cl.
*H01Q 5/28* (2015.01)
*H01Q 5/335* (2015.01)
*H01Q 1/22* (2006.01)
*H01Q 11/14* (2006.01)
*H01Q 15/00* (2006.01)
*H01Q 15/24* (2006.01)
*H04B 1/18* (2006.01)
*H04B 1/40* (2015.01)

(52) U.S. Cl.
CPC .............. *H01Q 5/28* (2015.01); *H01Q 1/225* (2013.01); *H01Q 5/335* (2015.01); *H01Q 11/14* (2013.01); *H01Q 15/0066* (2013.01); *H01Q 15/24* (2013.01); *H04B 1/18* (2013.01); *H04B 1/40* (2013.01)

(58) Field of Classification Search
None
See application file for complete search history.

(56) References Cited

U.S. PATENT DOCUMENTS

| 8,780,943 B2 * | 7/2014 | Moshfeghi | H04W 88/02 370/498 |
| 2010/0297962 A1 | 11/2010 | Rofougaran | |
| 2014/0133435 A1 * | 5/2014 | Forenza | H04L 5/0023 370/329 |
| 2016/0233944 A1 | 8/2016 | Viswanathan | |

(Continued)

FOREIGN PATENT DOCUMENTS

WO    2014/143320    9/2014

OTHER PUBLICATIONS

International Search Report and Written Opinion of PCT International Application No. PCT/US2020/028932 dated Aug. 31, 2020, 13 pages.

*Primary Examiner* — Amy Cohen Johnson
*Assistant Examiner* — James H Cho
(74) *Attorney, Agent, or Firm* — Mark H. Williams

(57) ABSTRACT

A battery management system includes a primary module in wireless communication with a plurality of sensing, or secondary, modules over a range of frequencies within a predetermined frequency band. Each of the primary module and the sensing modules can be configured to transmit with an antenna polarization setting chosen from a plurality of polarization settings. Each of the sensing modules is configured to communicate with the primary with a predetermined one of its polarization settings for each channel. The primary module is also configured to communicate with a respective secondary module with a predetermined polarization setting for each channel.

8 Claims, 6 Drawing Sheets

(56) References Cited

U.S. PATENT DOCUMENTS

2016/0308279 A1* 10/2016 Athley .................... H01Q 3/28
2017/0126458 A1*  5/2017 Shattil ................ H04L 27/2615
2018/0054088 A1*  2/2018 Zeine .................. H04B 5/0037
2018/0342807 A1   11/2018 Watson et al.
2019/0059064 A1*  2/2019 Ghosh .................. H04W 24/02

* cited by examiner

RADIO FREQUENCY TRANSCEIVER WITH AN ANTENNA HAVING SELECTABLE POLARIZATION

BACKGROUND

A battery management system (BMS) manages a rechargeable battery pack, for example, one found in an electric vehicle. The BMS monitors the battery pack's operating state and, additionally, authenticates it or balances it. In a known BMS, the monitoring modules communicate over an electric wired link. Thus, additional components, and the corresponding increased opportunity for failure, are needed to allow the monitoring modules to communicate with one another.

What is needed is an improved approach for providing communications between monitoring modules in a BMS.

SUMMARY

In one aspect of the present disclosure, there is a transceiver having selectable antenna polarization, comprising an antenna structure; a first device switchably coupled to the antenna structure; a controller, coupled to the first device, configured to operatively couple or decouple the first device to or from the antenna structure, to set a polarization of the antenna structure.

The transceiver can comprise a first switch coupling the first device to the antenna structure, wherein the controller is coupled to the first switch, and wherein the controller is configured to set a state of the first switch.

The transceiver can further comprise a second device switchably coupled to the antenna structure; a second switch coupling the second device to the antenna structure, wherein the controller is coupled to the second switch, and wherein the controller is further configured to set a state of the second switch.

Each of the first and second switches can comprise at least one RF switch, and the at least one RF switch can comprise at least one pin diode.

Further, an RF signal generator can be coupled to the controller; and an impedance matching network can be coupled to the RF signal generator, the antenna structure and the controller, wherein the controller is further configured to modify the impedance matching network to match the RF signal generator and the antenna structure.

In another aspect of the present disclosure, there is a method of configuring a transceiver, the method comprising (a) setting an antenna structure to a first polarization configuration, (b) transmitting a signal with the polarization configuration set in (a); (c) repeating steps (a)-(b) for at least one other polarization configuration; (d) receiving an indication of an operating polarization configuration; and (e) storing the received operating polarization configuration to be used by the transceiver.

The method can further comprise transmitting a plurality of signals, each signal at a respective frequency value within a predetermined range of frequency values; receiving an indication of an operating polarization configuration for each frequency; and storing the received operating polarization configuration for each frequency to be used by the transceiver.

In another aspect of the present disclosure there is a method of configuring primary and secondary transceivers in a battery management system, each of the primary and secondary transceivers provided with adjustable antenna polarization settings, the method comprising:

for each unique pair of the primary transceiver and a respective secondary transceiver:
for each combination of primary and secondary polarization settings:
for each channel in a range of channels:
transmitting a signal from the secondary to the primary;
measuring at least one parameter of the signal received at the primary;
storing the at least one measured signal parameter for the respective primary and secondary polarization settings combination and channel;
determining, for each secondary transceiver, an operating polarization setting for each channel, the determination being a function of the stored at least one measured signal parameters for the respective secondary transceiver;
determining a primary transceiver operating polarization setting for each unique combination of primary transceiver, secondary transceiver and channel, the determination being a function of the stored at least one measured signal parameters for the respective secondary transceiver;
storing, in each secondary transceiver, the respective determined operating polarization setting for each channel; and
storing, in the primary transceiver, the primary transceiver operating polarization settings for the unique combinations of primary transceiver, secondary transceiver and channel.

In another aspect of the present disclosure there is a method of configuring primary and secondary transceivers in a battery management system, each of the primary and secondary transceivers provided with adjustable antenna polarization settings, the method comprising:

(a) selecting a unique pair comprising the primary transceiver and a respective secondary transceiver;
(b) setting the selected unique pair of primary and secondary transceivers of step (a) to a unique combination of respective polarization settings;
(c) selecting a channel in a range of channels;
(d) transmitting a signal from the secondary to the primary of the pair of step (a) on the selected channel of step (c);
(e) measuring at least one parameter of the transmitted signal as received at the primary;
(f) storing the at least one measured signal parameter for the respective primary and secondary polarization settings combination of step (b) and selected channel of step (c);
(g) repeating steps (c)-(f) for each channel in the range of channels for the primary and secondary pair in step (b);
(h) repeating steps (b)-(g) for each unique combination of respective polarizations settings for the primary and secondary pair in step (a);
(i) repeating steps (a)-(h) for each unique pair of primary and secondary;
(j) determining, for each secondary transceiver, an operating polarization setting for each channel, the determination being a function of the stored at least one measured signal parameters for the respective secondary transceiver;
(k) determining a primary transceiver operating polarization setting for each unique combination of primary transceiver, secondary transceiver and channel, the determination being a function of the stored at least one measured signal parameters for the respective secondary transceiver;
(l) storing, in each secondary transceiver, the respective determined operating polarization setting for each channel; and (m) storing, in the primary transceiver, the primary transceiver operating polarization settings for the unique combinations of primary transceiver, secondary transceiver and channel.

Each channel can be set to a corresponding frequency value.

The at least one measured signal parameter can be signal strength.

In another aspect of the present disclosure there is a method of operating a transceiver comprising determining a first channel over which communications will be sent; configuring the transceiver to communicate over the determined first channel; retrieving, from a memory, a first polarization setting corresponding to the first channel; configuring an antenna structure to have the first polarization setting; and transmitting a signal over the first channel with the antenna configured at the first polarization setting.

Configuring the antenna structure to have the first polarization can comprise one of: coupling or decoupling the antenna structure, respectively, to or from ground.

Configuring the antenna structure to have the first polarization can comprise one of: coupling or decoupling a first device to or from the antenna structure.

BRIEF DESCRIPTION OF THE DRAWINGS

Various aspects of the disclosure are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The Figures are provided for the purposes of illustration and explanation and are not intended as a definition of the limits of the disclosure. In the Figures.

DETAILED DESCRIPTION

Details are set forth in order to provide a thorough understanding of the aspects of the disclosure. It will be understood by those of ordinary skill in the art that these may be practiced without some of these specific details. In other instances, well-known methods, procedures, components and structures may not have been described in detail so as not to obscure the aspects of the disclosure.

A wired communication link between battery monitoring modules requires additional components, increases the cost and uses valuable space within the battery system. As set forth below in more detail, a wireless data link between modules provides a competitive advantage by, for example, reducing costs and optimizing the use of the space inside the battery pack. Radio Frequency (RF) transmissions can be used for the wireless link, however, there are design issues that need to be considered when using RF technology.

One has to consider that the space for RF propagation within a battery pack is very crowded and will only become more so as future battery pack designs will be smaller and denser with more batteries disposed in the space. In addition, the environment in which the RF waves circulate has a large number of metallic components that cause a multi-path effect, due to a complex combination of couplings and reflections, that negatively affects RF signal transmission quality.

In this metal-enclosed environment, polarization of the field associated with an RF transmission causes path loss between a transmitter and a receiver. Advantageously, in accordance with aspects of the present disclosure presented herein, the ability to provide polarization diversity for transceivers communicating with one another inside the enclosure improves the RF link budget of a wireless battery management system.

In one aspect of the present disclosure, the polarization of an antenna structure is changed in order to modify the electromagnetic field path inside the battery pack from a transmitter to a receiver. This polarization change, in one approach, uses RF switches such as the PE42359 available from Peregrine Semiconductor or the SKY13330-397LF from Skyworks Solutions. Alternatively, the switches can be implemented with pin diodes, for example, the BAR64 series available from Infineon Technologies AG. Accordingly, changing a conducted RF current path inside the antenna structure modifies the radiation pattern by modifying the polarization of the generated RF field and compensates for the negative effects of the multi-path effect.

Figure 1:
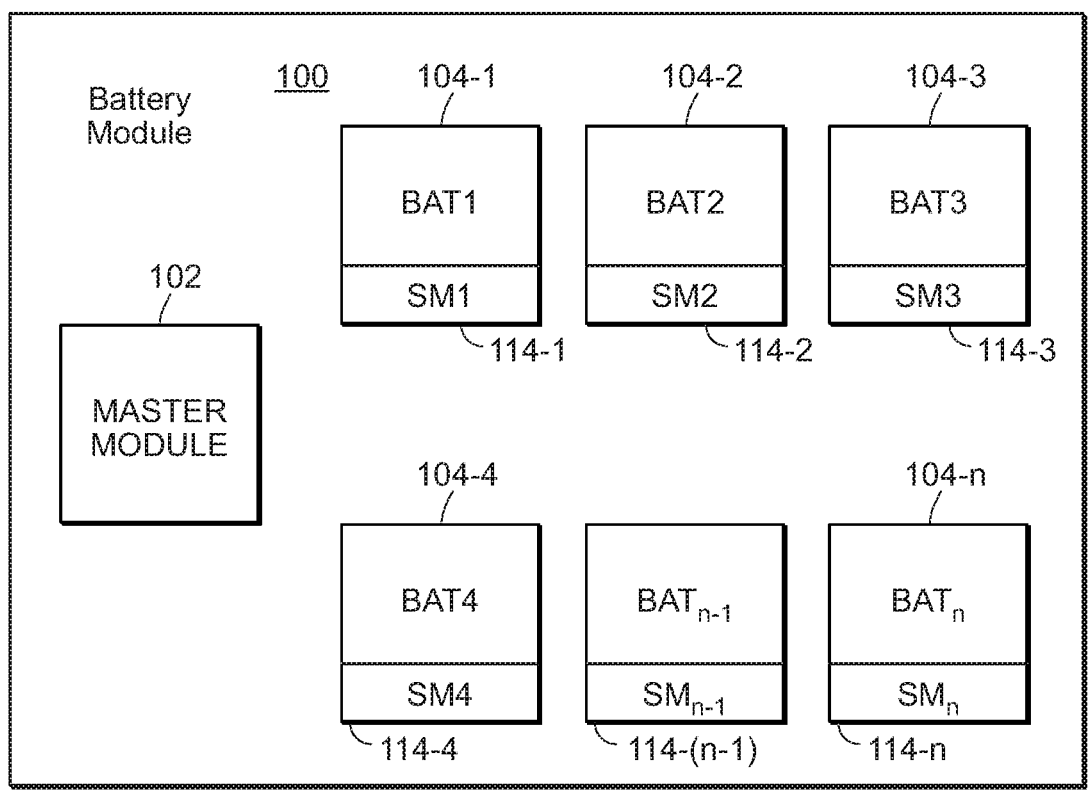
FIG. 1 is a battery management system in accordance with an aspect of the present disclosure.

Referring now to FIG. 1, a battery management system 100 includes a primary module 102, a plurality of batteries 104-1 . . . 104-n and a plurality of sensing, or secondary, modules 114-1 . . . 114-n, with each battery 104-x having a corresponding sensing module 114-x. The primary module 102 communicates with the sensing modules 114-x over a wireless communication scheme, for example, RF. Each sensing module 114-x monitors the operating condition of the corresponding battery including, but not limited to, voltage level, temperature, charge level, etc. Alternatively, each of the primary and sensing modules may be referred to as a transceiver or a transceiving module.

Figure 2:
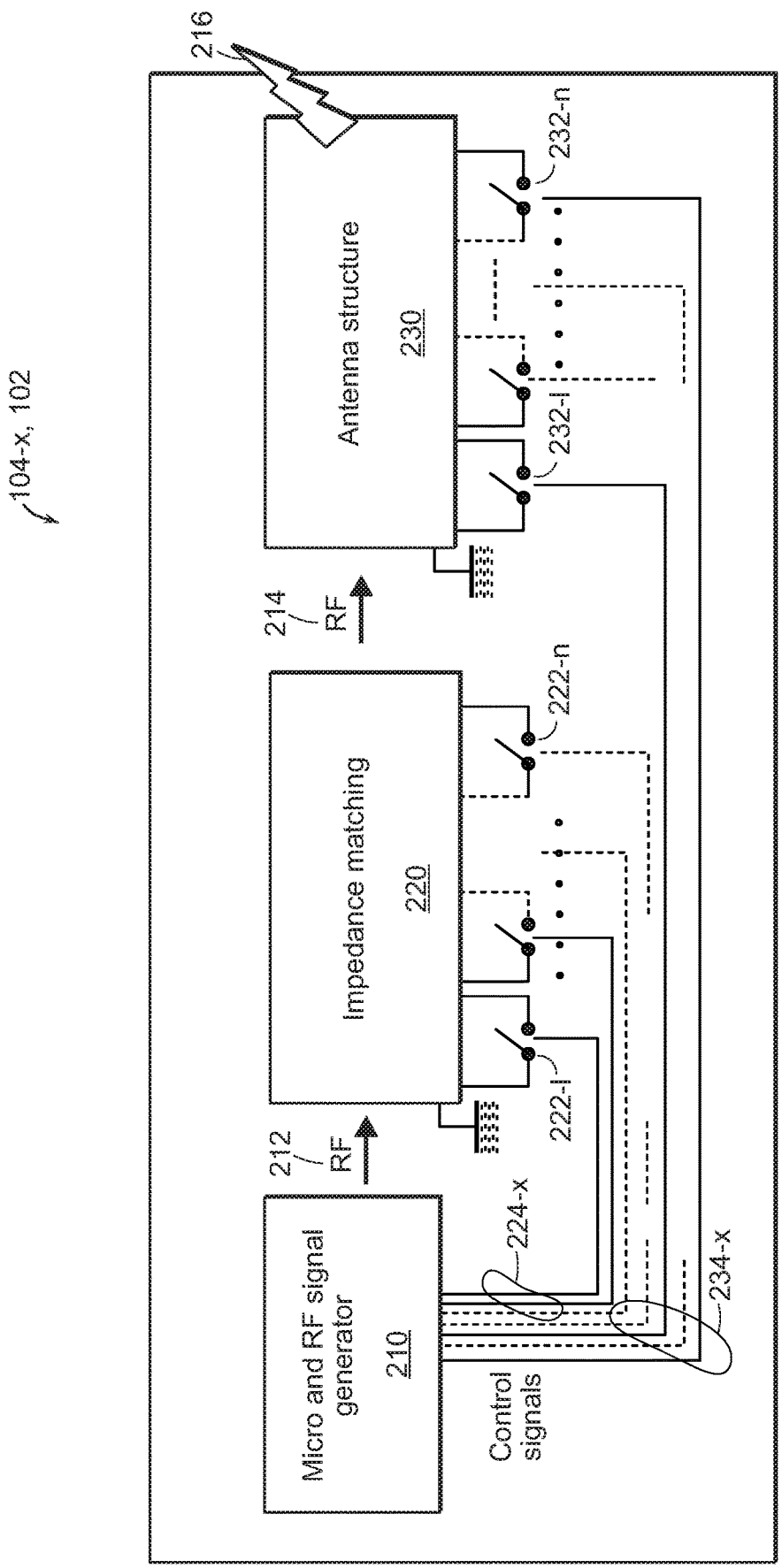
FIG. 2 is a functional block diagram of a primary module and sensing modules in the battery management system of FIG. 1.

The primary module 102 and each of the sensing modules 114-x includes components as shown in FIG. 2. More specifically, each module includes a microprocessor/RF signal generator 210 that provides a first RF signal 212 to an impedance matching network 220 that, in turn, provides a second RF signal 214 as a function of the first RF signal 212. One of ordinary skill in the art understands the operation of an impedance matching network in the field of RF transmissions and its operation is not described further. An antenna structure 230 receives the second RF signal 214 and emits a transmitted RF signal 216.

A configuration of the impedance matching network 220 can be modified as determined by the states of one or more switches 222-1 . . . 222-n that are controlled by the microprocessor/RF signal generator 210 via corresponding control lines 224-*x*. The switches 222-*x* are controlled by the microprocessor/RF signal generator 210 to provide an impedance match between the microprocessor/RF signal generator 210 and the antenna structure 230 by coupling/decoupling different parts of the impedance matching network 220 as is well understood by those of ordinary skill in the art.

It will be noted that the impedance matching network 220 is optional and need not be included. In some aspects of the present disclosure, switching the polarization of the antenna structure 230 is accomplished without modifying the input impedance. In other aspects, in order to provide efficient network matching, it is advantageous to provide the impedance matching network 220 and modifying its settings to perform best with the antenna and RF source. In other words, in some implementations of the present disclosure, providing an antenna with modifiable polarization features impacts its impedance characteristics and the impedance matching network 220 will compensate for this effect.

As will be described in more detail below, an operating polarization setting of the antenna structure is determined by the states of a plurality of switches 232-1 . . . 232-*n* that are controlled by the microprocessor/RF signal generator 210 via corresponding control lines 234-*x*. Components are coupled/decoupled to the antenna structure 230 to determine the operating polarization setting.

Figure 3:
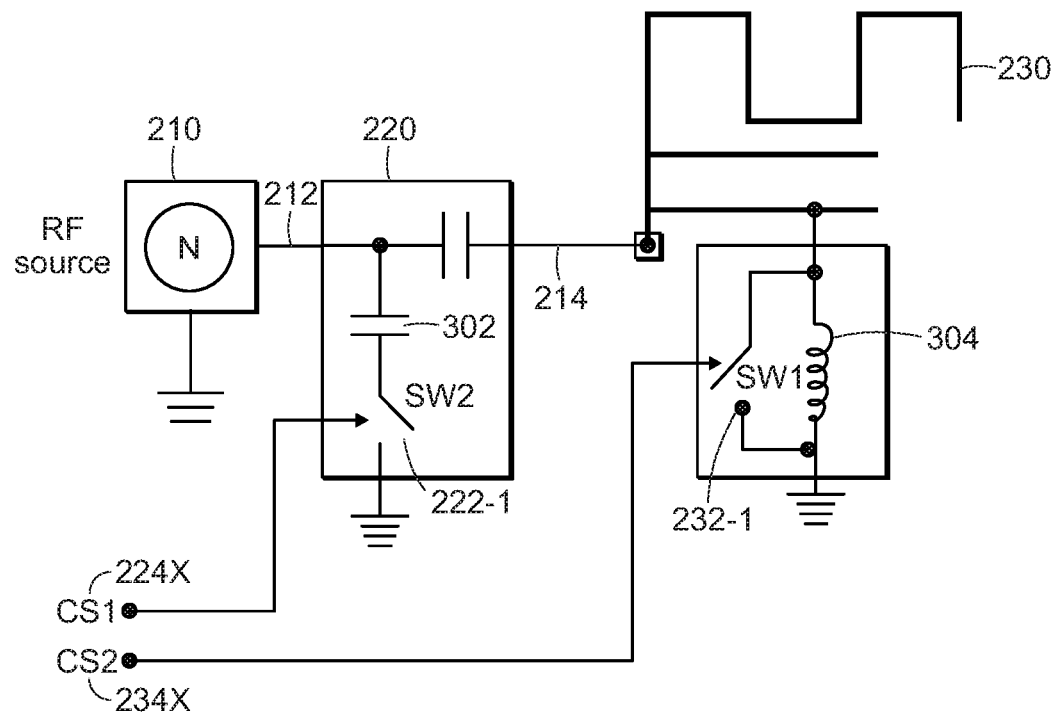
FIG. 3 is a circuit diagram of a portion of a primary or sensing module.
Figure 4:
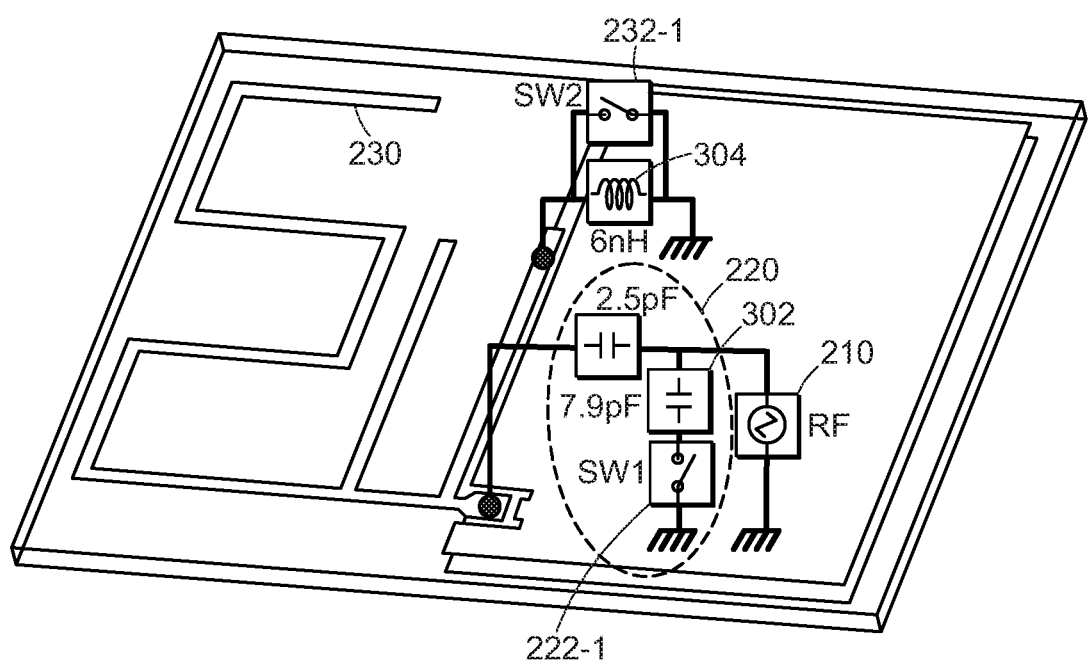
FIG. 4 is a conceptual view of the circuit diagram of FIG. 3.

In a non-limiting example, provided for explanatory purposes, as shown in FIGS. 3 and 4, two switches 232-1 and 222-1 are used to modify the polarization of the antenna structure 230. The impedance matching network 220 includes a capacitor 302 that has one terminal coupled to the output 212 of the RF source 210 and the other terminal coupled to the switch 222-1 (SW2), which is controlled by a control line 224-1 (CS1). The switch SW1, when closed, couples the output 212 of the RF source 210 to ground via the capacitor 302 and, therefore, two configurations of the impedance matching network 220 are provided. The switch 232-1 (SW1) couples/decouples an inductor 304 between ground and the antenna structure 230. In the explanatory structure of FIGS. 3 and 4, the antenna structure 230 has two possible polarization settings where Configuration 1: switch 232-1 (SW1) is closed, switch 222-1 (SW2) is open.

Configuration 2: switch 232-1 (SW1) is open, switch 222-1 (SW2) is closed.

Figure 7:
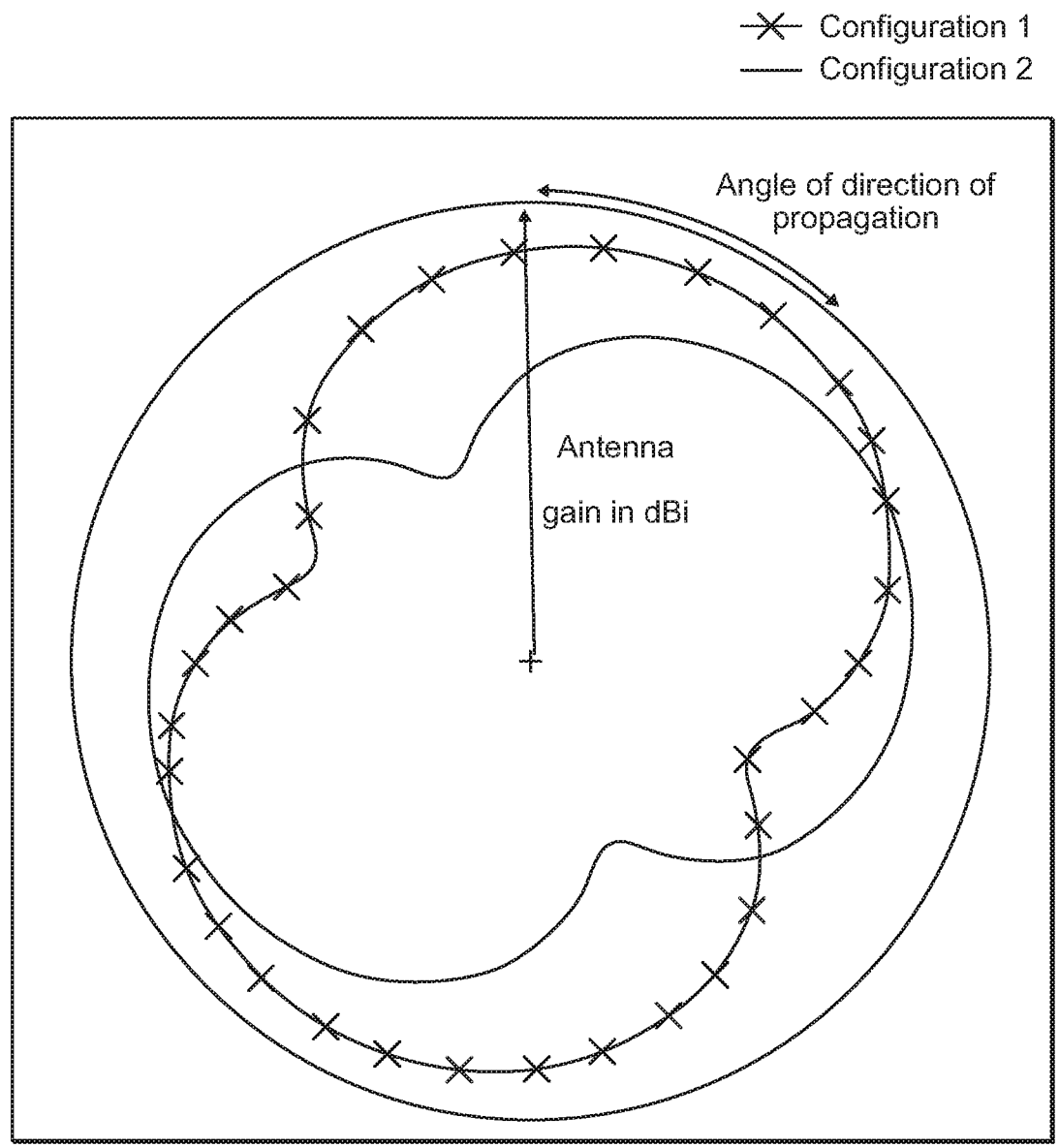
FIG. 7 is a graph depicting far field electromagnetic vectors corresponding to different antenna configurations in accordance with an aspect of the present disclosure.

As presented in FIG. 4, the antenna structure 230 can be implemented on a planar Printed Circuit Board (PCB) 402. Referring to FIG. 7, the far field electromagnetic vectors for the Configurations 1 and 2 are plotted as viewed from the top of the printed circuit board 402. As can be seen, the different polarization configurations cause the shape of the radiation plot to rotate around a vertical axis.

In the examples discussed above, the impedance network 220 is in a different state for each of the Configurations due to the state of switch 222-1 (SW2). As has been discussed above, however, in some aspects of the present disclosure, an impedance network is not necessary as the polarization of the antenna can be changed with minimal effect of any impedance mis-match that might arise.

One of ordinary skill in the art will understand that any number of capacitors or other components, and respective switches, can be implemented in order to provide more than two states of the impedance matching network 220. Similarly, any number of inductors, or other components, and respective switches, can be implemented in order to provide more than two polarization settings of the antenna 230. Further, each switch can be an RF switch implemented with, for example, pin diodes.

In accordance with an aspect of the present disclosure, in order to provide for effective, i.e., optimum, wireless communication between the primary module 102 and each of the sensing modules 114-*x*, the most effective combination of the operating polarization settings for each pair of primary module 102 and sensing module 114-*x*, for each available channel in the communications spectrum, is determined. This can be done as part of an initialization process when the battery management system 100 is first installed or could be performed at some point after installation if there appears to be an issue with degraded communication performance. In addition, if the mechanical dimensions of the battery module are changed, for example, a re-initialization may be in order. Such changes could be due to repair or a physical modification of the inside of the module. These changes can also occur due to mechanical perturbations such as, for example, the vibration or dilation of the batteries after a prolonged period of use due to, e.g., temperature effects, chemical reactions, etc. These behaviors are dependent on the type of vehicle which ranges from small electric vehicles up to large electric trucks. Thus, these changes may be occurring quite often in large vehicles with complex battery packs and possibly never in smaller hybrid vehicles.

A method 500 of determining an optimum polarization settings in accordance with an aspect of the present disclosure will be described with reference to FIG. 5. Generally, the method determines the optimum polarization settings between the primary module and the sensing modules. It should be noted that the impedance may also be adjusted to provide RF efficiency, however, it is not necessary to the aspects of learning the optimum polarization combinations.

Figure 5:
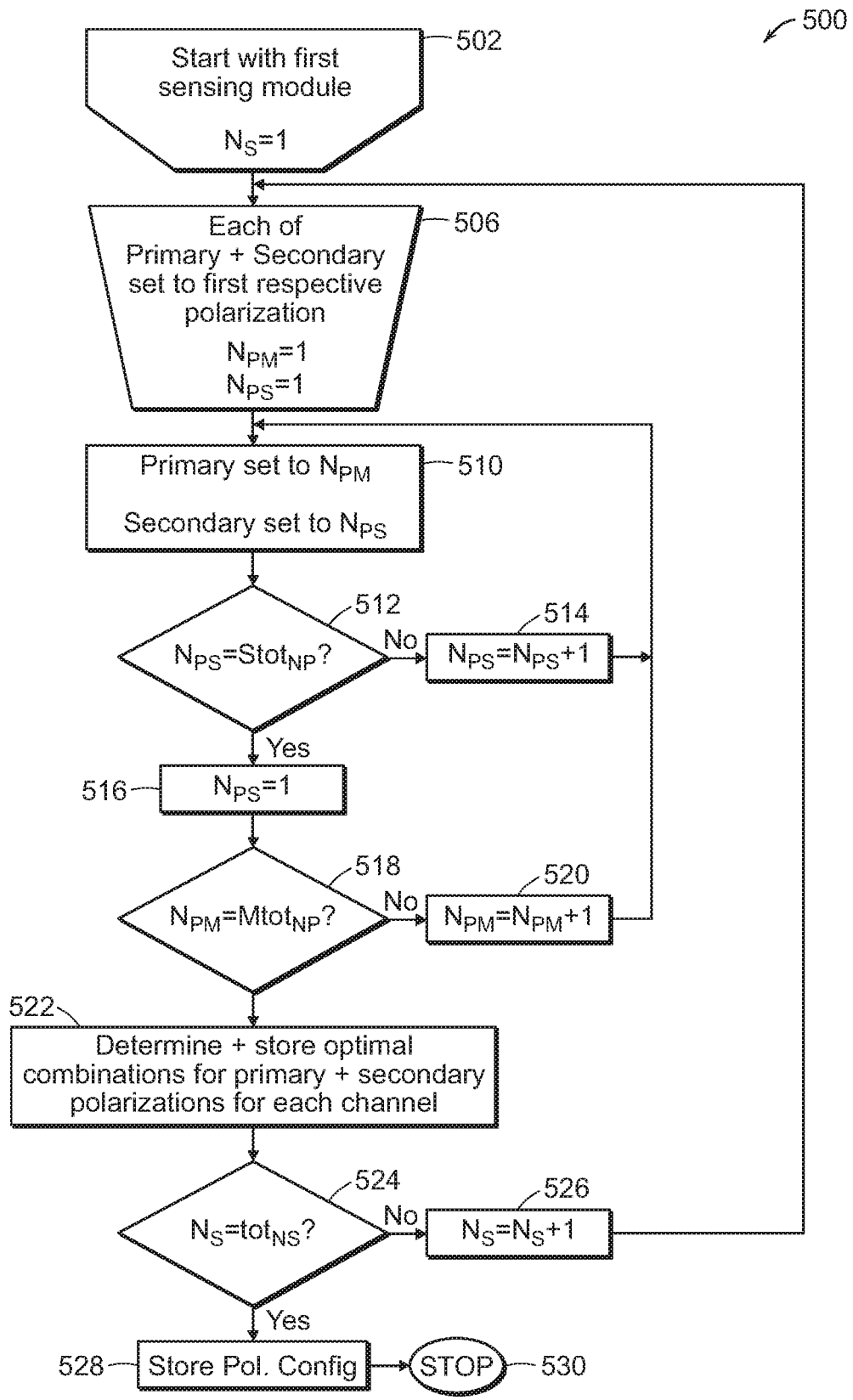
FIG. 5 is a method of determining optimum polarization settings of the primary and sensing modules of the battery management system of FIG. 1 in accordance with an aspect of the present disclosure.

In the flowchart of FIG. 5, the following variables are implemented:

Mtot(Np)=the total number of possible polarization settings for the primary module 102.

Stot(Np)=the total number of possible polarization settings for a respective sensing module 114-*x*.

Tot(Ns)=the total number of sensing modules 114-*x* in the battery module 100.

Nps=a number representing a current polarization setting of the respective sensing module.

Npm=a number representing a current polarization setting of the primary

The method 500 begins at Step 502 where the current sensing module is set to Ns=1 to begin with the first sensing module in the set of sensing modules. At Step 506, the current primary module polarization setting is set to Npm=1, representing a first polarization setting and the current polarization setting of the respective sensing module is set to Nps=1, representing a first polarization setting. Of course, it is assumed that each of the primary and sensing modules has at least two different polarization settings.

At Step 510 the primary sets its polarization to a current value of Npm and instructs the sensing module Ns to set its polarization to a current value of Nps. The primary instructs the current sensing module to transmit a signal on each channel and the primary records a corresponding signal strength for the signal received on a respective channel with the corresponding primary and sensing module polarization settings. The signal strength, in one approach, is the RF power level as received at the primary module and is measured in dBm, referred to as Received Signal Strength Indication (RSSI).

The primary module coordinates the transmissions over the different channels per the multi-channel methodology being implemented. Frequency hopping methodologies are known and the protocol for communication is well established. In one non-limiting example, an initial communication is sent over a predetermined "advertising" channel, e.g., Bluetooth uses 2.402 GHz, 2.426 GHz or 2.480 GHz but other frequencies can be used as well. During this very first communication, the primary instructs the secondary to start transmitting from channel 0 and once the signal strength measurement is made, the primary instructs, over channel 0, the secondary to go to the next channel (1) and so on up to the last one. In the event that communication is lost, for example, no answer after a timeout period, the primary and secondary go back to the advertising channel to reconnect.

At Step 512, it is determined whether the current sensing module polarization setting Nps=Stot(Np), i.e., whether all of the total number of possible sensing module polarization settings have been tested and, if not, then Nps is incremented to Nps=Nps+1, Step 514, and control returns to Step 510. If, at Step 512, the last sensing module polarization has been tested, control passes to Step 516 where Nps is reset to Nps=1 and, at Step 518, it is determined if Npm=Mtot(Np), i.e., have all primary module polarization settings been tested. If not, control passes to Step 520 where Npm is incremented to Npm=Npm+1 and control passes back to Step 510.

When all primary polarization settings have been tested for the current sensing module, per Step 518, control passes to Step 522 where the primary module determines an optimum polarization combination for each primary/sensing module combination and for each channel.

At Step 524, it is determined if Ns=Tot(Ns), i.e., have all sensing modules been tested. If not, control passes to Step 526 where Ns is incremented to Ns=Ns+1 to test the next sensing module and control passes to Step 506. Otherwise, control passes to Step 528 where the information is stored in each of the primary and sensing modules. The information can be stored in non-volatile memory as is known in the art and can be, in one non-limiting example, in the form of a lookup table. Subsequently, the initialization process then ends at Step 530.

The method 500 may also be described in pseudo-code:

could be tested and then the optimum combinations determined set as is set forth in the pseudo-code example.

In addition, it may be known ahead of the initialization process that certain combinations of polarizations are not effective and can be skipped.

Figure 6:
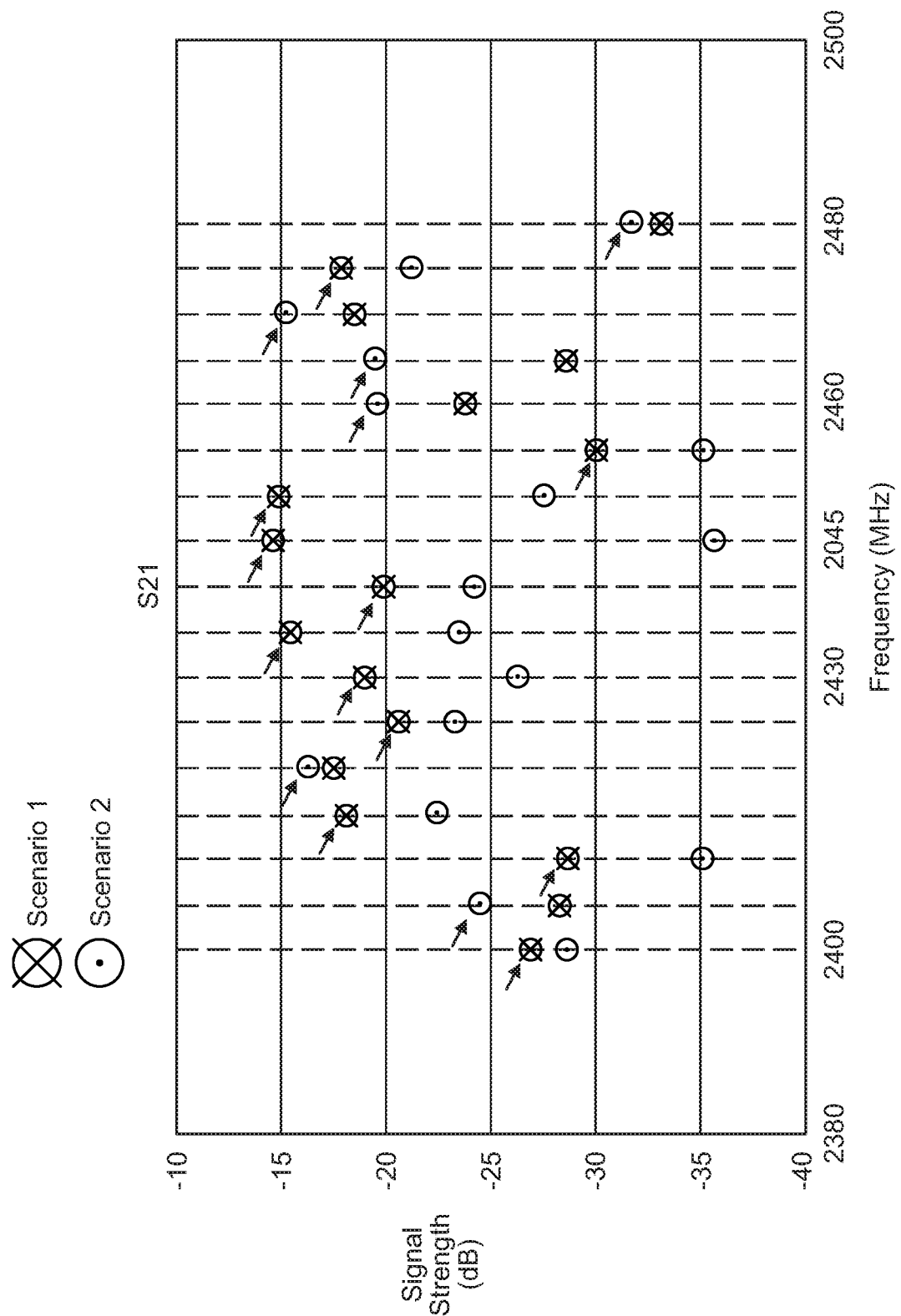
FIG. 6 is a graph depicting relative signal strengths detected during the determination method of FIG. 5.

As an aid to understanding aspects of the present disclosure, a chart presenting a subset of the measured signals between the primary module and one of the sensing modules is provided in FIG. 6. In this example, each of the primary module and the sensing module has two possible polarization settings but only two scenarios are tested. In a Scenario 1, the primary module is in its first polarization setting and the sensing module is in its second polarization setting. In a Scenario 2, the primary module is in its second polarization setting and the sensing module is in its first polarization setting. The respective measured signal strengths are presented and the strongest one in each channel, in an exemplary 2.4 GHz band, is identified.

It should be noted that the identification of a module as primary or secondary is only meant to identify functions. Accordingly, any one of the sensing or secondary modules could be configured as the primary.

Advantageously, the gain of the antenna and its radiated efficiency have very little sensitivity to the polarization of the antenna being modified per aspects of the present disclosure.

Various implementations of the above-described systems and methods described may be provided in digital electronic circuitry, in computer hardware, firmware, and/or software. An implementation can be as a computer program product, e.g., a computer program tangibly embodied in an information carrier. The implementation can, for example, be in a machine-readable storage device, for execution by, or to control the operation of, data processing apparatus. The implementation can, for example, be a programmable processor, a computer, and/or multiple computers.

The above-described implementations generally depict a computer implemented system employing at least one processor or processing unit executing program steps out of at least one memory to obtain the functions herein described. It should be recognized that the presently described methods may be implemented via the use of software, firmware or (A) for each unique pair of the primary and a respective secondary:
    (A)(1) for each combination of primary and secondary polarization settings:
        (A)(1)(a) for each channel in a range of channels:
            (A)(1)(a)(1) transmitting a signal from the secondary to the primary;
            (A)(1)(a)(2) measuring a parameter of the signal received at the
                primary;
            (A)(1)(a)(3) storing the measured signal parameter for the respective
            primary and secondary polarization settings combination and channel;
(B) determining, for each secondary, an operating polarization setting for each
    channel, the determination being a function of the measured signal parameter for
    the respective secondary;
(C) determining a primary operating polarization setting for each unique
    combination of primary, secondary and channel, the determination being a
    function of the measured signal parameter for the respective secondary;
(D) storing, in each secondary transceiver, the respective determined operating
    polarization setting for each channel; and
(E) storing, in the primary transceiver, the primary transceiver operating
    polarization settings for the unique combinations of primary transceiver,
    secondary transceiver and channel.

It should be noted that the determination of the optimum combinations of polarizations for the primary and a current sensing module, Step 522, is made before proceeding to the next sensing module. Alternatively, all sensing modules alternatively, implemented as a dedicated hardware solution such as an FPGA (field programmable gate array) and/or an ASIC (application specific integrated circuit). Modules, subroutines, and software agents can refer to portions of the computer program, the processor or processing unit, the special circuitry, software, and/or hardware that implements that functionality.

A computer program can be written in any form of programming language, including compiled and/or interpreted languages, and the computer program can be deployed in any form, including as a stand-alone program or as a subroutine, element, and/or other unit suitable for use in a computing environment.

As utilized, the one or more processing units may represent, for example, a CPU-type processing unit, a GPU-type processing unit, a field-programmable gate array ("FPGA"), digital signal processor(s) ("DSP"), or other hardware logic components that may, in some instances, be driven by a central processing unit ("CPU").

The computer-readable medium may store instructions executable by the one or more processing units and may include computer storage media and/or communication media. Computer storage media may include one or more of volatile memory, nonvolatile memory, and/or other persistent and/or auxiliary computer storage media.

It is to be understood that the disclosure is not limited in its application to the details of construction and the arrangement of the components set forth herein or illustrated in the drawings as it is capable of implementations or of being practiced or carried out in various ways. Also, it is to be understood that the phraseology and terminology employed herein are for the purpose of description only and should not be regarded as limiting.

Certain features, which are, for clarity, described in the context of separate implementations, may also be provided in combination in a single implementation. Conversely, various features, which are, for brevity, described in the context of a single implementation, may also be provided separately or in any suitable sub-combination.

The present disclosure is illustratively described in reference to the disclosed implementations. Various modifications and changes may be made to the disclosed implementations by persons skilled in the art without departing from the scope of the present disclosure as defined in the appended claims.

What is claimed is:

1. In a battery management system having a primary transceiver and a plurality of secondary transceivers, each of the primary and secondary transceivers provided with adjustable antenna polarization settings, a method of configuring the primary and secondary transceivers comprising:
   for each unique pair of the primary transceiver and a respective secondary transceiver:
      for each combination of primary and secondary polarization settings:
         for each channel in a range of channels:
            transmitting a signal from the secondary to the primary;
            measuring at least one parameter of the signal received at the primary;
            storing the at least one measured signal parameter for the respective primary and secondary polarization settings combination and channel;
   determining, for each secondary transceiver, an operating polarization setting for each channel, the determination being a function of the stored at least one measured signal parameters for the respective secondary transceiver;
   determining a primary transceiver operating polarization setting for each unique combination of primary transceiver, secondary transceiver and channel, the determination being a function of the stored at least one measured signal parameters for the respective secondary transceiver;
   storing, in each secondary transceiver, the respective determined operating polarization setting for each channel; and
   storing, in the primary transceiver, the primary transceiver operating polarization settings for the unique combinations of primary transceiver, secondary transceiver and channel.

2. The method of claim 1, wherein each channel is set to a corresponding frequency value.

3. The method of claim 1, wherein the at least one measured signal parameter is signal strength.

4. The method of claim 1, wherein each of the primary and secondary transceivers is configurable in at least two different polarization settings.

5. In a battery management system having a primary transceiver and a plurality of secondary transceivers, each of the primary and secondary transceivers provided with adjustable antenna polarization settings, a method of configuring the primary and secondary transceivers comprising:
   (a) selecting a unique pair comprising the primary transceiver and a respective secondary transceiver;
   (b) setting the selected unique pair of primary and secondary transceivers of step (a) to a unique combination of respective polarization settings;
   (c) selecting a channel in a range of channels;
      (d) transmitting a signal from the secondary to the primary of the pair of step (a) on the selected channel of step (c);
      (e) measuring at least one parameter of the transmitted signal as received at the primary;
      (f) storing the at least one measured signal parameter for the respective primary and secondary polarization settings combination of step (b) and selected channel of step (c);
      (g) repeating steps (c)-(f) for each channel in the range of channels for the primary and secondary pair in step (b);
   (h) repeating steps (b)-(g) for each unique combination of respective polarizations settings for the primary and secondary pair in step (a);
   (i) repeating steps (a)-(h) for each unique pair of primary and secondary;
   (j) determining, for each secondary transceiver, an operating polarization setting for each channel, the determination being a function of the stored at least one measured signal parameters for the respective secondary transceiver;
   (k) determining a primary transceiver operating polarization setting for each unique combination of primary transceiver, secondary transceiver and channel, the determination being a function of the stored at least one measured signal parameters for the respective secondary transceiver;
   (l) storing, in each secondary transceiver, the respective determined operating polarization setting for each channel; and
   (m) storing, in the primary transceiver, the primary transceiver operating polarization settings for the unique combinations of primary transceiver, secondary transceiver and channel.

6. The method of claim 5, wherein each channel is set to a corresponding frequency value.

7. The method of claim 5, wherein the at least one measured signal parameter is signal strength.

8. The method of claim 5, wherein each of the primary and secondary transceivers is configurable in at least two different polarization settings.

\* \* \* \* \*